United States Patent
Armangau et al.

(10) Patent No.: US 7,765,191 B2
(45) Date of Patent: Jul. 27, 2010

(54) METHODS AND APPARATUS FOR MANAGING THE REPLICATION OF CONTENT

(75) Inventors: Philippe Armangau, Acton, MA (US); Stephen J. Todd, Shrewsbury, MA (US); Michael Kilian, Harvard, MA (US)

(73) Assignee: EMC Corporation, Hopkinton, MA (US)

( * ) Notice: Subject to any disclaimer, the term of this patent is extended or adjusted under 35 U.S.C. 154(b) by 307 days.

(21) Appl. No.: 11/107,194

(22) Filed: Apr. 15, 2005

(65) Prior Publication Data

US 2006/0235908 A1 Oct. 19, 2006

(51) Int. Cl.
G06F 7/00 (2006.01)
G06F 17/00 (2006.01)
G06F 13/00 (2006.01)
G06F 13/28 (2006.01)

(52) U.S. Cl. .................. 707/651; 711/161; 711/162

(58) Field of Classification Search ............. None
See application file for complete search history.

(56) References Cited

U.S. PATENT DOCUMENTS

| 5,347,579 | A | 9/1994 | Blandford |
| 6,324,548 | B1 * | 11/2001 | Sorenson ............... 707/204 |
| 6,629,105 | B1 | 9/2003 | Young et al. |
| 2002/0196685 | A1 | 12/2002 | Topham |
| 2003/0110188 | A1 | 6/2003 | Howard et al. |
| 2005/0125384 | A1 | 6/2005 | Gilfix et al. |
| 2006/0041570 | A1 * | 2/2006 | Lowe et al. ............ 707/101 |
| 2006/0129602 | A1 * | 6/2006 | Witriol et al. .......... 707/104.1 |

FOREIGN PATENT DOCUMENTS

| EP | 0 940 945 A2 | 9/1999 |
| EP | 0 881 580 A3 | 2/2002 |
| GB | 2379059 A | 2/2003 |
| WO | WO 92/03000 A1 | 2/1992 |
| WO | WO 99/13415 A1 | 3/1999 |
| WO | WO 2004/074968 A3 | 9/2004 |

(Continued)

OTHER PUBLICATIONS

User Manual for "Eudora Archiver" archived on Feb. 18, 2004 at: http://web.archive.org/web/20040218022427/http://www.softobe.com/products/eaar/um/um.html.*

(Continued)

*Primary Examiner*—Charles Rones
*Assistant Examiner*—Harold A Hotelling
(74) *Attorney, Agent, or Firm*—Krishnendu Gupta; Penelope S. Wilson

(57) ABSTRACT

One embodiment of the invention is directed to providing a single instance storage capability in a content addressable computer system that stores content units in a time-based directory structure. Another embodiment is directed to managing access to content units that do not include a timestamp in their content addresses, in a time-based directory structure. A further embodiment is directed to accessing replicated content units stored on a computer, based on a time of replication. A further embodiment is directed to employing a bitmap in a time-based directory structure which may be used to indicate whether any content units stored during a specified time range are stored in the directory structure.

30 Claims, 12 Drawing Sheets

FOREIGN PATENT DOCUMENTS

WO     WO 2005/020098 A1     3/2005

OTHER PUBLICATIONS

Butt et al., "Kosha: A Peer-to-Peer Enhancement for the Network File System," *Supercomputing 2004. Proceedings of the ACM/IEEE SC2004 Conference*, Pittsburgh, PA, US, Nov. 6-Dec. 2004, Piscataway, NJ, USA, *IEEE* Nov. 6, 2004, pp. 51-61.

International Search Report and Written Opinion for International Application No. PCT/US2006/014181 mailed Oct. 25, 2006.

* cited by examiner

METHODS AND APPARATUS FOR MANAGING THE REPLICATION OF CONTENT

FIELD OF THE INVENTION

The present invention relates to managing the storage of content.

DESCRIPTION OF THE RELATED ART

When data is stored on a computer, the data may be organized in a file system that aids in storage, retrieval, and management of the data. A file system typically includes a plurality of directories or folders, which can be thought of as file cabinets which organize data. As used herein, the terms directory and folder are synonymous. Data may be organized into units termed files, and each file may be placed in one of the directories. In some file systems, directories may be organized into hierarchical trees, such that a directory may include one or more sub-directories.

As shown in FIG. 1, the file system may aid in organizing data and may help users of the computer system (e.g., human operators or application programs) locate and retrieve data. As shown in FIG. 1, file system 101 includes a root directory 103 which has three subdirectories (i.e., documents directory 105, games directory 107, and photographs directory 109). Documents directory 105 includes three additional subdirectories (i.e., legal documents directory 111, personal documents directory 113, and school documents directory 115) and photographs directory 109 includes one additional subdirectory (i.e., family vacation directory 117). Thus, for example, a user who is looking for a legal document previously stored in the file system may look in legal documents directory 111, which stores two files. Similarly, a user who is looking for a school document may look in school documents directory 115. Directories may also be used, for example, to group together files created by a particular application program. That is, for example, an application program that receives image data from a digital camera or a scanner device and creates image files from the image data may store these files in photographs directory 109. Thus, when the application program later retrieves an image file or when another user desires to access image files created by the application program, these image files may be located easily (i.e., by looking in photographs directory 109).

The way that data files are organized in the file system has little to do with the way that the data in these files is stored on the storage device(s) of the computer. That is, for example, although file 119 and file 121 are stored in the same directory in the file system, the data in file 119 is not necessarily stored in blocks on disk that are contiguous to those in which the data in file 121 is stored. Indeed, the data in file 119 may be stored nowhere near the data in file 121 on disk. Further, all of the data in a single file need not be stored in contiguous blocks. For example, part of the data of file 119 may be stored in blocks 0-4 on a particular disk, while the rest of the data in the file may be stored in blocks 15-18 on that disk.

When a user requests access to a file, the file system maps the logical location of the file to one or more physical locations on disk, retrieves the data stored at these physical locations from disk, and returns the data to the user.

SUMMARY OF THE INVENTION

One embodiment is directed to a method of managing the storing of a content unit on a computer, the method comprising acts, performed by the computer, of: (A) receiving, at the computer, a request to store the content unit; (B) in response to the request, associating a first identifier with the content unit; (C) determining whether a copy of the content unit is already stored by the computer, wherein the copy of the content unit is associated with a second identifier that is different from the first identifier; and (D) when it is determined that the content unit is already stored on the computer, refraining from storing an additional copy of the content unit in response to the request. Another embodiment is directed to at least one computer readable medium encoded with instructions that, when executed on a computer system, perform the above-described method.

A further embodiment is directed to at least one computer in a computer system, comprising: at least one storage device; and at least one controller, coupled to the storage device that: (A) receives a request to store the content unit; (B) in response to the request, associates a first identifier with the content unit; (C) determines whether a copy of the content unit is already stored by the computer, wherein the copy of the content unit is associated with a second identifier that is different from the first identifier; and (D) when it is determined that the content unit is already stored on the computer, refrains from storing an additional copy of the content unit in response to the request.

Another embodiment is directed to a method of accessing information in a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory, the method comprising acts of: (A) receiving a request to access a unit of information in the file system, wherein the request includes an identifier for the unit of information, and wherein the identifier does not identify a time related to a time of storage of the unit of information; (B) mapping the identifier into a time value using a mapping function that produces a reproducible time value for the identifier; and (C) selecting a directory from the plurality of directories, wherein the selected directory corresponds to the time value to which the identifier is mapped. A further embodiment is directed to at least one computer readable medium encoded with instructions that, when executed on a computer system, perform the above-described method.

Another embodiment is directed to at least one computer that maintains a hierarchical file system having a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory, the at least one computer comprising: at least one input; and at least one controller, coupled to that at least one input, that (A) receives, from the at least one input, a request to access a unit of information in the file system, wherein the request includes an identifier for the unit of information, and wherein the identifier does not identify a time related to a time of storage of the unit of information; (B) maps the identifier into a time value using a mapping function that produces a reproducible time value for the identifier; and (C) selects a directory from the plurality of directories, wherein the selected directory corresponds to the time value to which the identifier is mapped.

A further embodiment is directed to a method of accessing a replicated content unit on a computer, the replicated content unit being replicated at a first time and being stored in a hierarchical file system on the computer, the hierarchical file system having a plurality of directories arranged in a hierarchical tree, comprising at least one root directory and a plurality of non-root directories that each has a parent directory, wherein at least one of the plurality of directories in the tree correspond to a period of time subsumed by a period of time corresponding to its respective parent directory, the method comprising acts of: (A) receiving, at the computer, a request to identify content units stored to the computer during a specified time range that includes the first time; (B) determining that the replicated content unit was stored during the specified time range; and (C) returning an indication that the replicated content unit was stored to the computer during the specified time range. Another embodiment is directed to at least one computer readable medium encoded with instructions that, when executed on a computer system, perform the above-described method.

A further embodiment is directed to at least one computer that has a replicated content unit stored thereon, the replicated content unit being replicated at a first time and being stored in a hierarchical file system on the computer, the hierarchical file system having a plurality of directories arranged in a hierarchical tree, comprising at least one root directory and a plurality of non-root directories that each has a parent directory, wherein at least one of the plurality of directories in the tree correspond to a period of time subsumed by a period of time corresponding to its respective parent directory, the at least one computer comprising: at least one input; and at least one controller, coupled to the at least one input, that: (A) receives, through the at least one input, a request to identify content units stored to the computer during a specified time range that includes the first time; (B) determines that the replicated content unit was stored during the specified time range; and (C) returns an indication that the replicated content unit was stored to the computer during the specified time range.

Another embodiment is directed to a method of replicating a content unit on a computer, the computer having a hierarchical file system that has a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory, the method comprising acts of: (A) receiving, at the computer, a request to replicate a content unit to the computer, wherein the request is received at a first time; (B) storing the replicated content unit in the hierarchical file system of the computer, in a directory that does not correspond to a time related to the first time; and (C) storing on the computer an indication of the first time. A further embodiment is directed to at least one computer readable medium encoded with instructions that, when executed on a computer system, perform the above-described method.

Another embodiment is directed to at least one computer that stores replicated content units, the at least one computer having a hierarchical file system that has a plurality of directories arranged in a hierarchical tree, comprising at least one root directory and a plurality of non-root directories that each has a parent directory, wherein at least some of the plurality of directories in the tree correspond to a period of time subsumed by a period of time corresponding to its respective parent directory, the at least one computer comprising: at least one input; and at least one controller, coupled to the at least one input, that: (A) receives, through the at least one input, a request to replicate a content unit to the computer, wherein the request is received at a first time; (B) stores the replicated content unit in the hierarchical file system of the at least one computer, in a directory that does not correspond to a time related to the first time; and (C) stores on the at least one computer an indication of the first time.

DETAILED DESCRIPTION

Figure 1:
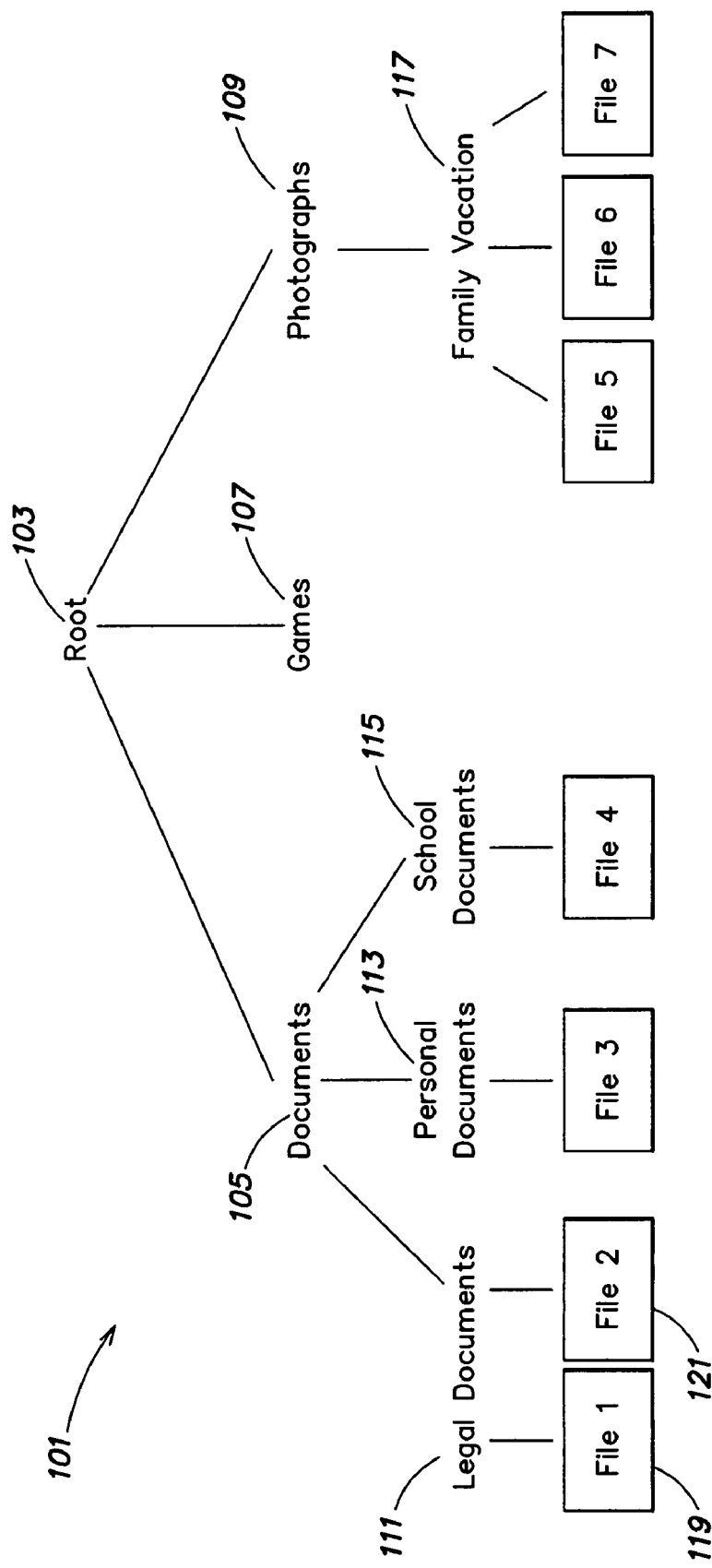
FIG. 1 is an example of hierarchical file system.

Embodiments of the invention relate to managing data stored on a computer.

When data is stored on a computer, there are several possibilities for organizing the data to aid in locating the data for future accesses. For example, the data may be stored in a database and may be located by performing a database query. As another example, the data may be stored in a file system. Embodiments of the invention described below are not limited to any particular manner of logically storing data (e.g., database or file system), as the data may be logically stored in any suitable way.

Time Based Directories

Some computers having a file system to manage units of content stored thereon provide a capability to enable stored content units to be accessed based on the time they were stored on the computer. In this respect, the file system may be organized based on time. Units of content may be stored as files in the file system and the file system location at which a content unit (e.g., a file) is stored may be selected based on the time at which the content unit was stored by the source (e.g., an application program). For example, a content unit that is stored on Jul. 31, 2004 at 11:00 AM may be stored in a directory structure having six levels (L1-L6 in hierarchical order), wherein directory L1 designates the year in which the content unit was stored, the subdirectory L2 designates the month, the subdirectory L3 designates the day, the subdirectory L4 designates the hour, the subdirectory L5 designates the minute, and the subdirectory L6 designates the second. Content units may be stored in the bottom level or "leaf" directory (e.g., the directory at L6). Thus, for example, the content unit stored on Jul. 31, 2004, at 11:00 AM may be stored in the L6 directory having a path of /2004/07/31/11/00/00, wherein "2004" is the L1 directory corresponding to the year 2004, "07" is a subdirectory of the 2004 directory corresponding to the month of July 2004, the subdirectory "31" of the "07" directory is the L3 directory corresponding to the 31$^{st}$ day of July, 2004, the subdirectory "11" of the "31" directory is the L4 directory corresponding to the 12$^{th}$ hour of the 31$^{st}$ day of July, 2004, the subdirectory "00" of the "11" directory is the L5 directory corresponding to the 1$^{st}$ minute of the 12$^{th}$ hour of the 31$^{st}$ day of July, 2004, and the subdirectory "00" of the "00" L5 directory is the L6 directory corresponding to the first second of the 31$^{st}$ minute of the 12$^{th}$ hour of the 31$^{st}$ day of July, 2004. If a second content unit were stored by an application program on Jul. 31, 2004 at 11:30 AM, the second content unit may be stored in the directory /2004/07/31/11/30/00.

It should be appreciated that the embodiments of the present invention described below that employ time in specifying a directory structure for storing content units are not limited to use with directory structures having the arrangement of the particular example described above, as the embodiments of the present invention can be implemented in any of numerous ways, including with directory structures using different units of time (or different granularities) as establishing boundaries for the subdirectory levels.

In the example above, the hierarchical directory structure had six levels and the smallest unit of time granularity (i.e., the lowest level in the hierarchy) corresponded to the second in which a content unit was stored. However, as mentioned above, embodiments of the invention described herein are not limited in this respect, as they can be used with directory structures having any suitable number of levels, with each level corresponding to any suitable unit of time. For example, the directory structure may include only four levels, with the smallest unit of time granularity being hours. In this respect, the total number of directories may be reduced (as compared to a directory structure with six levels) and the number of content units stored in each "leaf" directory may increase. Alternatively the number of levels in the hierarchy may be increased to, for example, seven levels with the lowest level of granularity (i.e., L7) corresponding to milliseconds. As a result the number of "leaf" directories may be increased and their may be fewer content units stored in each "leaf" directory.

Applicants have appreciated that the number of content units stored in each leaf directory may affect the performance of the system. As discussed above, the file system may map locations in the file system directory structure to physical disk locations (e.g., blocks). The mapping information that the file system uses to do this may be large, such that it may not be possible and/or feasible to store the entire map in memory. Thus, parts of the map may be cached in memory while the rest remains stored on disk. If there are a very large number of directories and only a small number of content units stored in each directory, then it is less likely that the file system location of a content unit to be retrieved is in the portion of the map that is cached. As a result, the file system may have to retrieve the relevant portion of the map from disk, resulting in a decrease in performance. On the other hand, if the number of directories in the directory structure is small and there are a large number of content units in the directory, the time spent locating the desired content unit within the appropriate directory may be increased, resulting in a decrease in performance.

It may be desirable to select a directory structure that balances these two competing factors. The optimum number of levels in the hierarchical structure may depend, for example, on the number of content units stored in the directory structure, the distribution of content units across the directory structure, and the frequency with which content units are stored in the directory structure. Thus, in one embodiment, the number of levels in the directory hierarchy is configurable and is alterable during the operation of the system. This may be accomplished, in the case of increasing the number of levels, by creating additional subdirectories for each leaf directory and moving content units down into the appropriate additional subdirectories. In the case of decreasing the number of levels, content units may be moved up into a parent directory of the subdirectory in which they are stored and the subdirectory may be removed from the hierarchy.

Content units stored in the time-based file system directory structure may be accessed in any suitable way. For example, in one embodiment in which the time-based file system directory structure is implemented on a content addressable computer, a content unit may be accessed using a content address. A content address is a unique identifier for a content unit which is computed based, at least in part, on the content of the content unit. For example, the content of the content unit may be hashed and the hash value may form a portion of the content address. Examples of content addressable computers and content addressable storage systems are described in a number of commonly assigned applications listed in Table 1 below, each of which is incorporated herein by reference in its entirety.

In one embodiment, the content address for a content unit may include information in addition to the hash of its content. Any suitable information may be included, as the invention is not limited in this respect. In one embodiment, for example, a timestamp may be included as part of the content address. The timestamp may reflect the time at which the content unit was initially stored to the computer. For example, when a request to store a content unit is received, the content unit may be hashed to generate the hash value and a timestamp may be generated based on a time related to the storage of the content unit. The timestamp may be computed by the entity that sent the request (e.g., based on the time that the request was sent), by the storing entity (e.g., based on the time that the request was received), or in any other suitable way, as the invention is not limited in this respect. The hash value and the timestamp may be combined to form the content address of the content unit. This may be done in any suitable way, as the invention is not limited in this respect. For example, the hash value may precede the timestamp in the content address, may follow the timestamp in the content address, or the hash value and the timestamp may be intermixed in any suitable way.

The content address may also include other information in addition to or instead of the timestamp. For example, the content address may include a guaranteed unique identifier (GUID), which is a string of bits that may be included in the content address to guarantee the uniqueness of the content address. That is, for example, the hash function used to hash the content unit and generate the hash value may not guarantee the uniqueness of hash values (i.e., two different inputs to the hash function may yield the same output). A GUID may be included to avoid a situation where two different content units may have the same content address.

In one embodiment, when a content unit is stored as a file in the time-based directory on the computer, the content address (or portion of the content address) for the content unit may be used as the filename for the file. However, the invention is not limited in this respect, as any suitable filename may be used.

A content unit stored in the time-based file system directory structure may be retrieved, for example, using the content address of the content unit. For example, using the timestamp portion of the content address, the time at which the content unit was stored on the computer may be determined. Because the content unit is stored in the time-based directory corresponding to the time of storage of the content unit, the directory in which the content unit is stored may be determined from the timestamp. A list of content units stored, as files, in that directory may be determined by accessing the directory and the correct content unit may be selected from this list by comparing the hash value of the content address for the requested content unit to the hash values of the content addresses of the content units stored in the directory, and selecting the content unit whose hash value matches.

In embodiments in which the content address of a content unit is used as the filename for the file storing the content unit, the hash value need not be computed for each content unit in the directory to compare to the hash value for the requested content unit. Rather, the hash value for the requested content unit may be compared to the hash value in the filenames of the content units stored in the directory.

Alternatively, the filename of a content unit may be the hash value of the content unit and the timestamp of the content unit (e.g., rather than the filename including only the hash value). Thus, the content unit may be located by comparing the hash and timestamp for the requested content unit to the filenames of the files in the directory.

Single Instance Store

Applicants have appreciated that, in some situations, it may be desirable to allow storage of a particular content unit only one time. Thus, if a user attempts to store a content unit that is already stored on the computer, the computer may bypass storage of the content unit, so that two copies of the same content unit are not stored on the storage system. However, from the perspective of the entity requesting storage of the content unit, the storage system has accepted and processed the storage request. This may be done in any suitable way, as the invention is not limited in this respect.

In one embodiment, described in application Ser. No. 09/236,366, listed in Table 1 below, which is hereby incorporated by reference in its entirety, when a request to store a content unit is received and the content unit to be stored is assigned a content address, the hash value of the content address may be compared to the hash values of the content addresses for the content units already stored. However, in embodiments in which content units are assigned content addresses with information in addition to the hash value (e.g., a timestamp and/or GUID), determining whether a content unit is already stored on the storage system by comparing content addresses may not be possible, as two content units which have the same content and thus, the same hash value, may have different content addresses because the timestamps and/or GUIDs added to the hash value to form the content addresses are different. Further, in embodiments in which the content units are stored in a time-based directory structure and are not indexed or organized based on their hash values, comparing the hash value of the content unit identified in the storage request to the hash values of the content units stored on the storage system may be a time-consuming and resource-intensive process. Such a process may involve comparing the hash value of every content unit stored in the time-based directory structure to the hash value of the content unit to be stored until either a match is found or all hash values have been compared.

In accordance with one embodiment, a process is provided for performing single instance storage (i.e., avoid storage of duplicate copies of a content unit already stored) in circumstances where an identifier for a content unit includes information in addition to the hash value. It should be appreciated that a computer may mirror content units stored thereon. That is, the computer may create additional copies of content units stored thereon, so that content is not lost if the original copy is corrupted or destroyed. The providing of the single instance storage capability is not intended to prevent (and, indeed, does not prevent) the mirroring of content units by the computer. Rather, the single instance storage capability is applicable to attempts to store multiple copies of the same content unit by users of the content (e.g., human operators and/or application programs).

Figure 2:
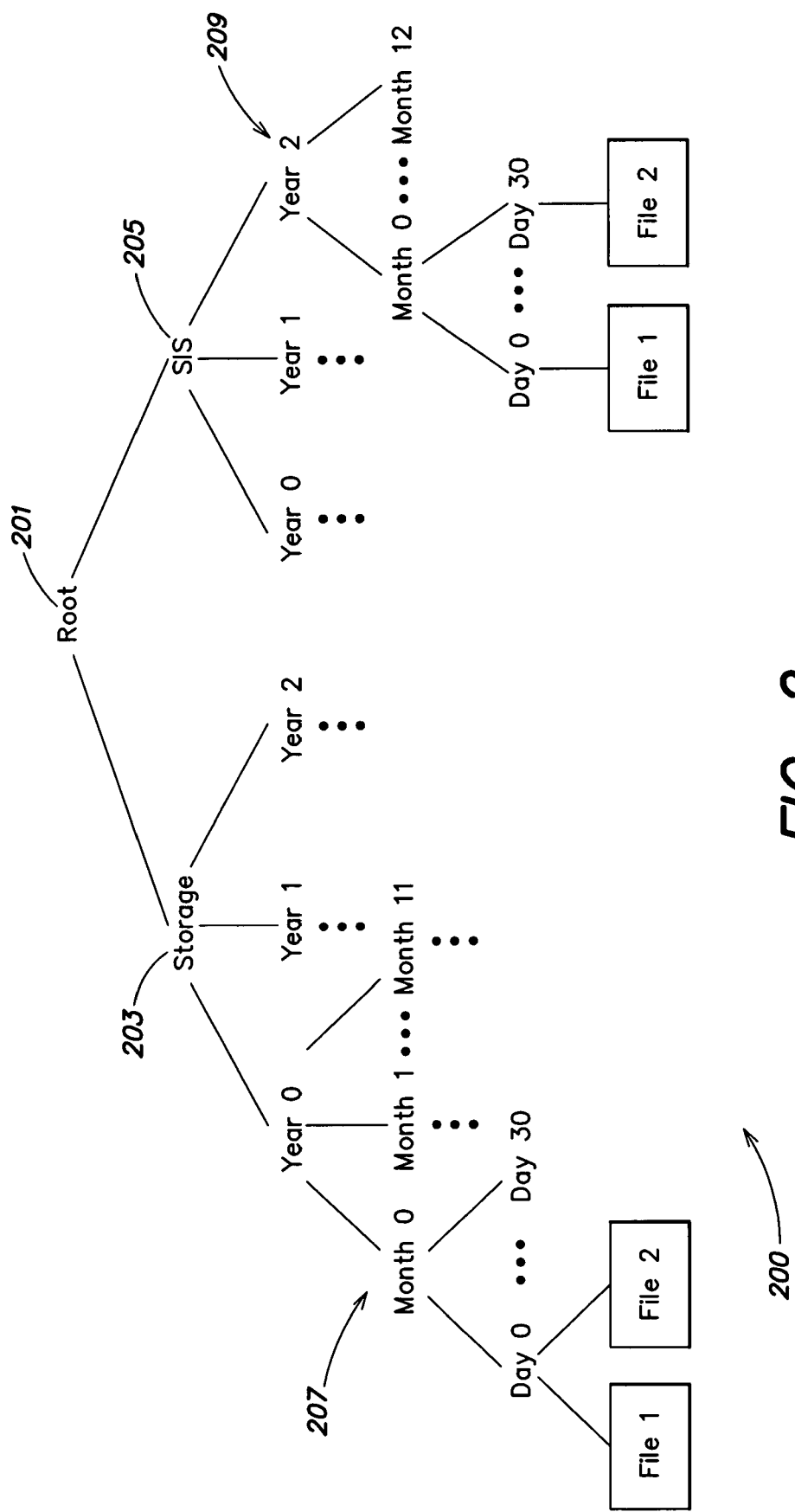
FIG. 2 is an example of a time-based directory structure, in accordance with one embodiment of the invention.

The single instance storage capability described above may be implemented in any suitable way. In one embodiment, a time-based directory structure 200, as shown in FIG. 2, may be employed that includes two separate sets of time-based directories. For example, root directory 201 may have two subdirectories: a storage subdirectory 203 and a single instance store (SIS) subdirectory 205. Both storage subdirectory 203 and SIS subdirectory 205 may serve as a root directory for a time-based directory structure (e.g., directory structure 207 and directory structure 209, respectively). It should be understood that, for the sake of clarity, the entire directory structure of time-based directory structure 200 is not expanded in FIG. 2. That is, many of the subdirectories that may be included in the time-based directory structure are not shown. Further, the time-based directory structure of FIG. 2 has a hierarchy of three levels (year, month, and day). It should be appreciated that this is provided only as an example, as the hierarchy may include any suitable number of levels corresponding to any suitable units of time (e.g., year, month, week, day, hour, minute, second, etc.). In addition, directory structure 207 and directory structure 209 need not have the same number of levels in their hierarchies and those levels need not correspond to the same units of time.

When a content unit is stored to the computer and a content address (including a timestamp) is assigned to the content unit, a file storing the content unit may be stored in time-based directory structure 207 (i.e., the time-based directory structure below storage directory 203 in the hierarchy). Thus, the content unit may be placed in the directory in directory structure 207 corresponding to its time of storage (e.g., as indicated in the timestamp).

In addition, in accordance with one embodiment of the invention, the content address of the content unit may be input into a process which maps the hash value of the content address into a time value in a reproducible manner, such that the same hash value always maps to the same time value. Any suitable process or mapping may be used, as the invention is not limited in this respect. For example, in one embodiment, the process used to generate the time value may be a many-to-one mapping, such that several different hash values may yield the same time value. The time value generated from the hash value of the content address may be used to select a corresponding directory in time-based directory structure 209 (i.e., the time-based directory structure below SIS directory 205). A file having the content address of the content unit may be stored in the selected directory to indicate that the content unit is stored in directory structure 207.

In one embodiment, the file stored in the selected directory in directory structure 209 may include additional information pertaining to the content unit. Any suitable information may be included, as the invention is not limited in this respect. For example, information that indicates the directory (i.e., the path) in directory structure 207 in which the file storing the content unit is located may be included. Such information may be useful when creating a pointer to the original content after a subsequent request to store identical content is received. The creation of such pointer is discussed below in greater detail. Additionally, a reference count that aids in deletion of the content unit may be included, as is discussed below in greater detail.

Figure 3:
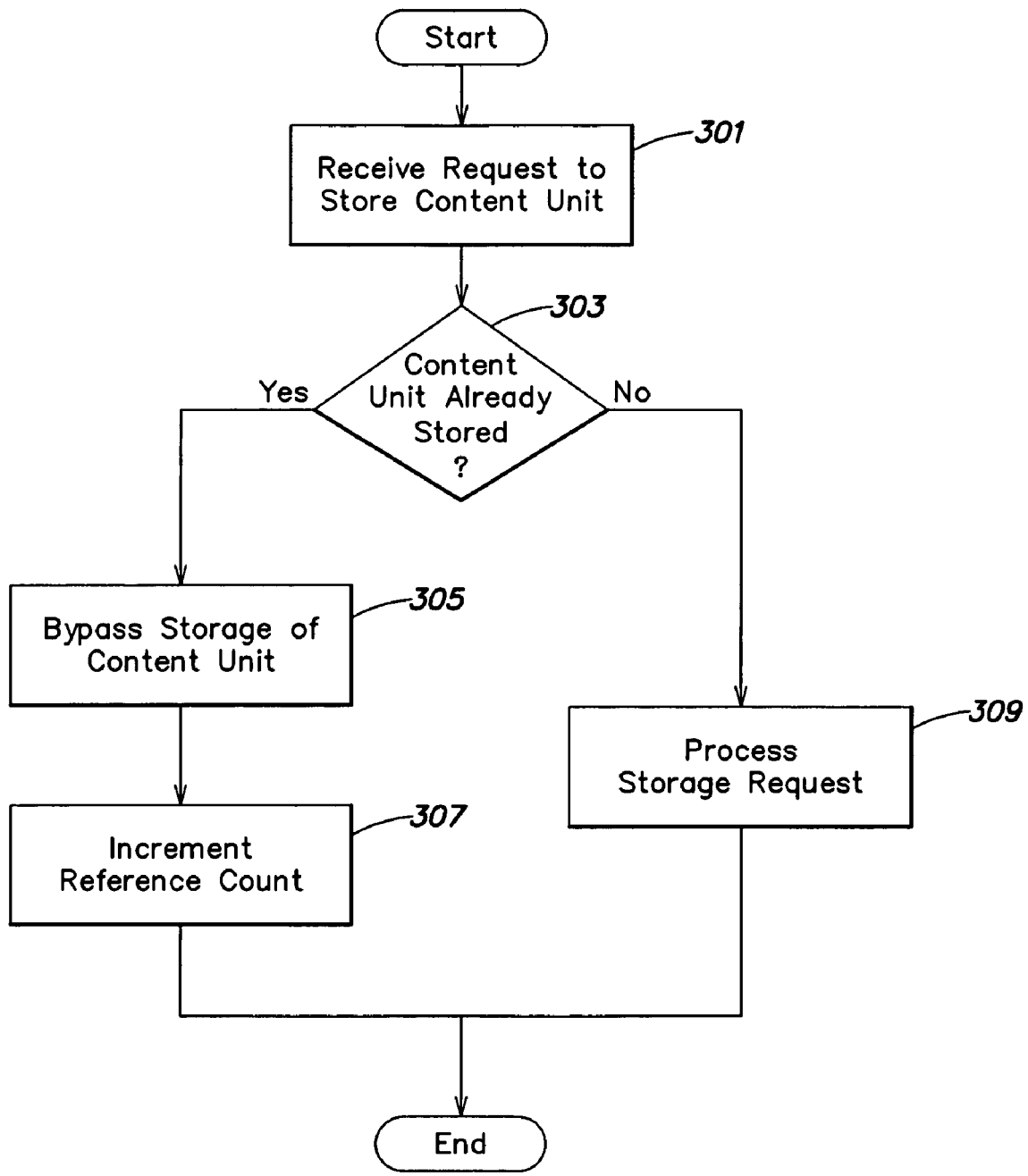
FIG. 3 is a flow chart showing an illustrative process for performing a single instance storage capability, in accordance with one embodiment of the invention.

In one embodiment, directory structure 209 aids in providing the single instance store (SIS) capability. A process for implementing a SIS capability in response to receipt of a request to store a content unit is shown in FIG. 3. The process shown in FIG. 3 is only one example of a process that may be employed and any suitable process may be used, as the invention is not limited in this respect.

Initially, a request to store a content unit is received (act 301). At act 303, it may be determined if the content unit is already stored in directory structure 200. This may be done, for example, by determining the content address for the content unit requested for storage, mapping the hash value of the content address into a time value (as described above), and locating the directory in directory structure 209 that corresponds to the time value (if it exists). If no such directory exists or if there is no file name that includes the hash value of the content unit to be stored, then it is determined that the content unit has not been previously stored on the computer. Thus, the process may continue to act 309, wherein the storage request is processed and the content unit may be stored on the computer.

If, when the directory corresponding to the time value is located, a file is found that includes the hash value in its filename, the process may continue to act 305, where storage of the content unit may be bypassed (i.e., because the content unit is already stored on the computer). In addition, in embodiments of the invention where the file includes a reference count, at act 307, the reference count may be incremented for reasons discussed below in greater detail.

In the illustrative directory structure 200 described above, files stored in directory structure 209 may use the hash portion of the content addresses (or any other suitable portion of the content addresses) of their corresponding content units as filenames. However, the invention is not limited in this respect, as any suitable filename may be used. When the content address is not used in the filename of the content address, the content address may be stored in the content of the file, so that the content unit in the directory structure 209 may be identified by its content address.

Figure 4:
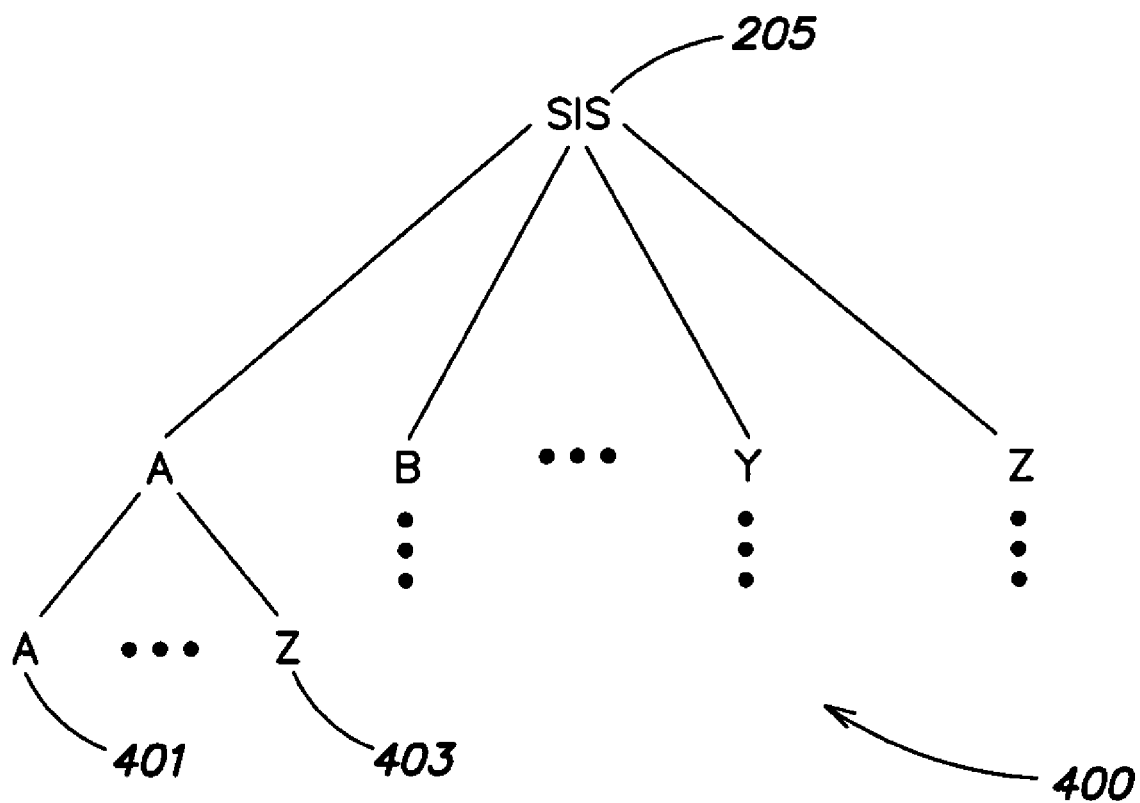
FIG. 4 is an example of a directory structure organized based on the hash value of content units, in accordance with one embodiment.

Further, in the example of FIG. 2, directory structure 209 is a time-based directory structure. It may be useful, in some situations, to organize directory structure 209 as a time-based directory structure, particularly when directory structure 207 is a time-based directory structure. Because the mechanism (e.g., the software code) for storing a content unit in and retrieving a content unit from a time-based directory structure already exists (i.e., for storage and retrieval in directory structure 207), it may be convenient to use the same time-based technique to store information in directory structure 209. However, the invention is not limited in this respect, as any suitable directory structure may be used for the SIS directory structure. For example, directory structure 209 may be a directory structure that is organized based on hash values in content addresses. For example, as shown in FIG. 4, SIS directory 205 may have a plurality of subdirectories which correspond to the first character in the hash value of a content address. Each of these directories may have a plurality of subdirectories corresponding to the second character of the hash value in the content address. These subdirectories may have additional subdirectories corresponding to additional characters in the content address, based on the desired number of levels in the hierarchy. A file corresponding to a content unit may be stored in one of these directories based on the content address of the content unit. Thus, for example, if the content address begins with first two characters 'AA,' it may be stored in directory 401. Similarly, if the content address begins with the first two characters 'AZ,' it may be stored in directory 403. In this respect, it may not be necessary to map the hash value of the content address to a time value, as a directory in directory structure 209 may be selected using other methods, such as, for example, the hash value of the content address.

In the example directory structure 400 of FIG. 4, directories were named based on ASCII characters. It should be appreciated that a content address is a series of bits, such that the hash value of the content address may be represented as an ASCII string. However, other representations of the series of bits are also possible, and the invention is not limited to representing the hash value as an ASCII string. In this respect, it should be understood that the names and organization of directories need not be ASCII based, as the directory structure may be organized based on the hash value of the content address in other ways.

Applicants have appreciated that even when, in response to a request to store a content unit, storage of the content unit is bypassed (i.e., because of the single instance storage capability), it may be desirable to assign a content address to the content unit and allow the entity that requested storage of the content unit to access the previously-stored copy of the content unit using the new content address.

Thus, when a storage request for a previously stored content unit is received, a timestamp for the content unit is assigned, and it is determined that the content unit is already stored in the directory structure, a pointer file may be stored in directory structure 207 in a directory corresponding to the time the storage request was received, as indicated in the timestamp. The content address of the content unit may be used as the filename of the pointer file. The pointer file need not include the content of the content unit, but rather may include an indication of the directory in which the file storing the previously-stored copy of the content unit is located (i.e., a "pointer"). This file location may be determined from the file corresponding to the content unit in directory structure 209.

Thus, when a subsequent request to access the content unit is received that identifies the content unit by its identifier, the pointer file may be located based on the timestamp in the identifier, and the actual content may be located and returned using the pointer in the pointer file.

In one embodiment, the filename of the pointer file may include an additional character or characters (i.e., in addition to the content address of the content unit) to indicate that the file stores a pointer to the content unit and not the actual content itself. Any suitable character or characters may be used and may be located at any position in the filename, as the invention is not limited in this respect.

In the example described above, the single instance store capability is implemented on a content addressable computer system that identifies content units using a content address.

However, the aspects of the invention relating to single instance store are not limited to use with a content addressable computer system. For example, the SIS capability could be performed on a so-called "block I/O" computer in which data is identified using a disk block address (either physical or logical) rather than a content address. The SIS capability may be performed on the block I/O computer in any suitable way. For example, in one embodiment, the "block I/O" storage system may maintain a record of hash values for content units stored thereon. When a request to store content is received, a hash value for the content may be computed and compared to the hash values in the record to see if the content has already been stored by the storage system.

Deletion of Content Units In A System with SIS Capability

In one embodiment, two types of content units may be stored on the computer (and consequently, in the directory structure): blobs and content descriptor files (CDFs). Blobs may include application data, such as, for example, a patient x-ray, company financial records, or any other type of data. Each blob has at least one CDF associated with it. A CDF may include a list of content addresses, which serves a list of references to one or more blobs and/or CDFs and may also include metadata and a plurality of references to blobs or other CDFs. The metadata included in the CDF may be information pertaining to the CDF, and/or information pertaining to the blobs and/or other CDFs referenced by the CDF. Such information may include, for example, a description of the data stored in each referenced blob or any other suitable information, as the invention is not limited in this respect. The use of blobs and CDFs are described in greater detail in the applications listed in Table 1.

Figure 5:
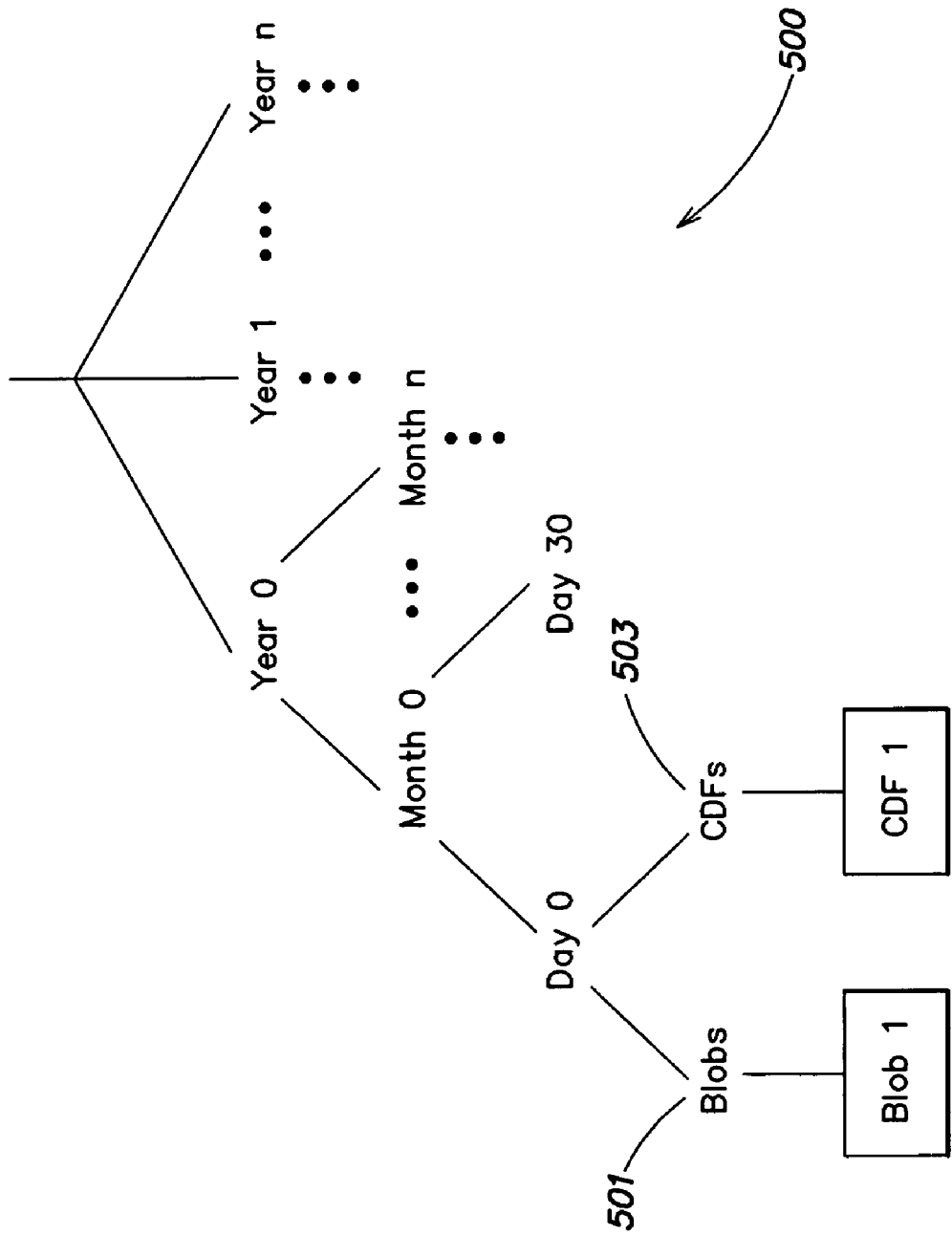
FIG. 5 is an example of a time-based directory structure in which blobs and CDFs are stored separately, in accordance with one embodiment.

In one embodiment, the directory structure may include separate directories for blobs and CDFs, although the invention is not limited in this respect, as blobs and CDFs may be stored in the same directory. FIG. 5 shows an example of a time-based directory structure 500 in which blobs and CDFs are stored in separate subdirectories. Each subdirectory that corresponds to the smallest unit of time in the directory structure ("days" in the example of FIG. 5) may have two subdirectories, one for blobs (directory 501) and one for CDFs (directory 503). Blobs may be stored in the blobs subdirectory and CDFs may be stored in the CDFs directory.

Users may access content stored in blobs using the content addresses of the CDFs that reference those blobs. For example, when a user desires access to content stored in a blob, it may send a request for the CDF that references the blob. In response, the CDF and any blobs referenced by the CDF may be returned by the storage system. Likewise, when a user desires to delete the data stored in a blob, the user may request deletion of the CDF. The CDF may be deleted, but deletion of the blobs referenced by the CDF may be handled by a background garbage collection process. Examples of using a garbage collection process for the deletion of blobs are described in greater detail in the applications in Table 1. For example, a reference count for each blob may be maintained that tracks the number of CDFs that reference the blob. This reference count may be maintained in any suitable way, as the invention is not limited in this respect. For example, as described above, the reference count may be stored in the file in directory structure 209 that corresponds to the blob. The background garbage collection process, may, for example, periodically check the reference count for a blob and, if the reference count is zero, delete the blob.

Thus, when a request to delete a CDF is received, the file corresponding to the CDF may be located in directory structure 207. The blobs and/or other CDFs referenced by the CDF may determined by looking at the reference list in the content of the CDF and the reference count of each of these blobs and/or other CDFs may be decremented (e.g., by locating the file corresponding to the blob in directory structure 209 and decrementing the reference count for the blob stored therein). If a content address in the reference list of the CDF corresponds to a pointer file rather than a file that includes the actual content, the pointer file may be deleted. It may be determined that a file is a pointer file rather than an actual file by examining the filename of the file and determining if the filename includes the additional character or characters that are indicative of a pointer file, as discussed above. The file that stores the CDF may also be deleted in response to the request to delete the CDF.

It should be appreciated that in some situations the pointer file may not be deleted. For example, if multiple CDFs reference the pointer file and not all of those CDFs are to be deleted in response to the delete request, than the pointer file may not be deleted. In one embodiment, a reference count may be maintained for the pointer file that indicates the number of CDFs that reference the pointer file. When a CDF referencing the pointer file is deleted, the reference count may be decremented. When the reference count is zero, the pointer file may be deleted.

In the example described above, a background garbage collection process was used to delete blobs. However, the invention is not limited in this respect, as the deletion of blobs may be performed in any suitable way. For example, when the reference count for the blob is decremented to zero, the corresponding blob may also be deleted synchronously with the decrementing of the reference count.

Reflections

In one embodiment of the invention, when a CDF or blob is deleted, a reflection for the deleted CDF or blob may be created. A reflection is a content unit that replaces a deleted blob or CDF and may include information about the deleted blob or CDF. For example, the reflection may include a portion (or all) of the content of the content unit to be deleted, information identifying the content unit to be deleted, and/or audit information. The audit information may include, for example, the time of deletion of the content unit, the user or application program that generated the request to delete the content unit, the network address of the computer that generated the request to delete the content unit, the size of the content unit to be deleted, and/or any other suitable information. Examples of the use of reflections are described in application Ser. Nos. 11/034,613, 11/034,737, and 11/034,732, which are listed in Table 1 below.

Figure 6:
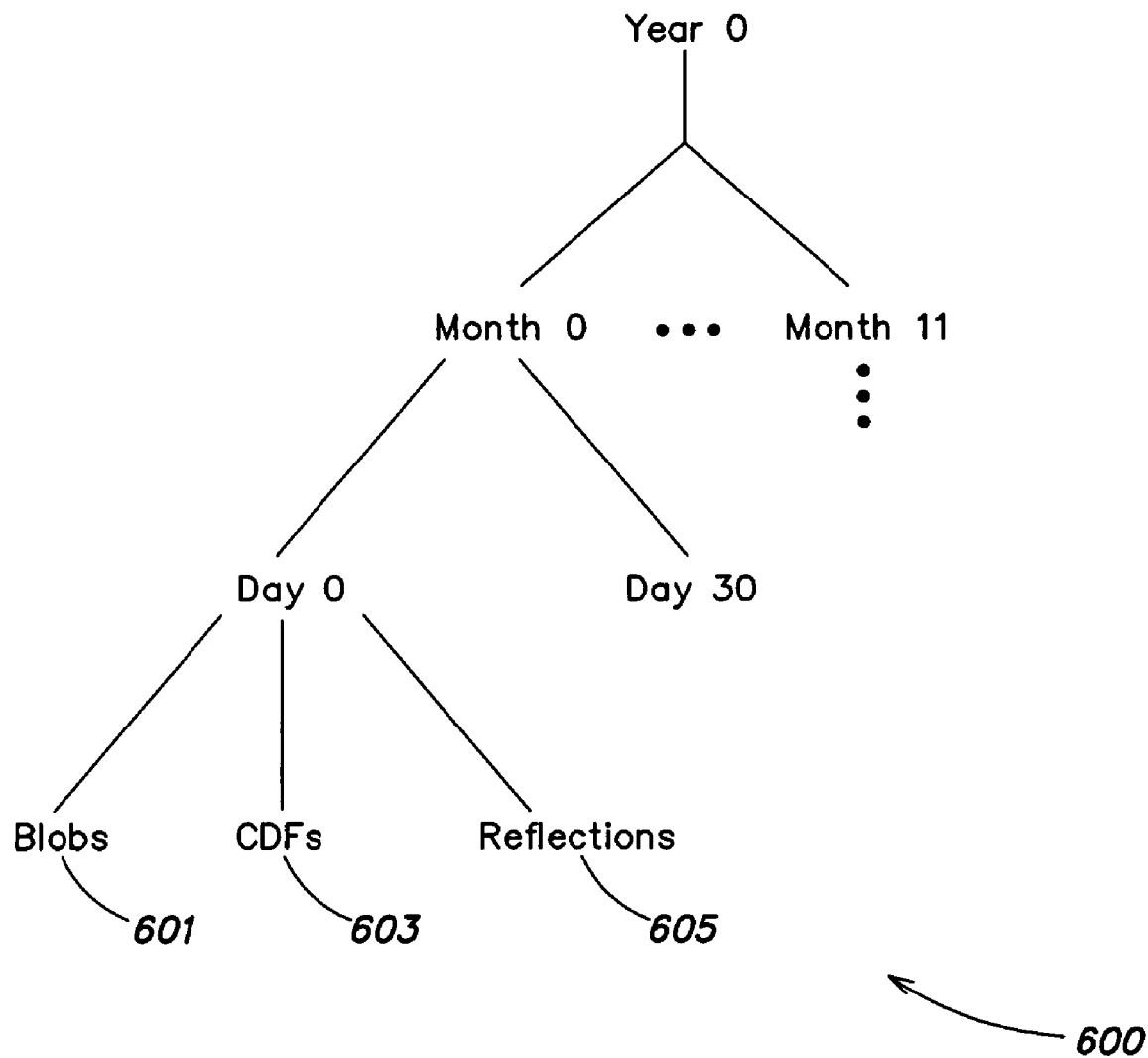
FIG. 6 is an example of a time-based directory structure in which reflections may be stored separately from blobs and CDFs, in accordance in one embodiment.

In one embodiment, the directory structure may include an additional directory for storing reflections, though the invention is not limited in this respect as the reflection may be stored in the same directory as blobs and/or CDFs. FIG. 6 shows a portion of a directory structure 600 that includes a separate directory for reflections. That is, each subdirectory that corresponds to the smallest unit of time in the directory structure ("days" in the example of FIG. 6) may have three subdirectories, one for blobs (directory 601), one for CDFs (directory 603), and for reflections (directory 605). When a content unit is deleted, a reflection may be created and stored in the reflections directory that corresponds to the time of deletion of the content unit. Thus, for example, in FIG. 6, a reflection for a content unit that was deleted on day0 of month0 of year0 would be stored in reflections directory 605.

Storage of Content Units Without a Timestamp

In some situations, content units that do not have timestamps in their content addresses may be received for storage in a time-based directory structure. This may occur, for example, when the entity sending the request is not capable of handling content addresses with timestamps (e.g., because it is using an older software version).

Figure 7:
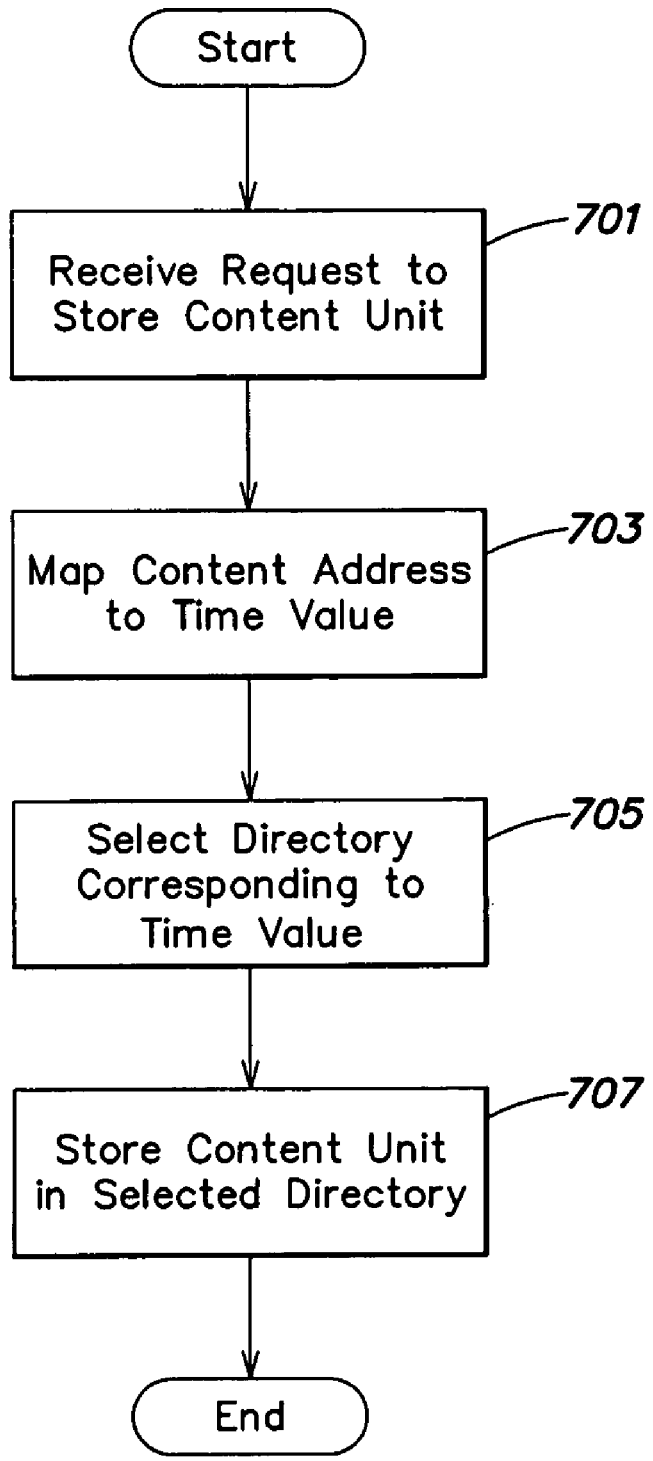
FIG. 7 is a flow chart illustrating a process for storing a content unit that does not have a timestamp in its content address in a time-based directory structure, in accordance with one embodiment.

An example of a process for storing, in a time-based directory structure, content units with content address that do not have timestamps is illustrated in FIG. 7. The process shown in FIG. 7 is only one example of process that may be used to store content units not associated with a time stamp in a time-based directory structure and other processes may be used, as the invention is not limited in this respect.

At act 701, a request to store a content unit is received. The request may indicate that the requesting entity is not capable of handling content addresses with timestamps in any suitable (e.g., by not providing a timestamp). The process continues in act 703, wherein the content address for the content unit is mapped to a time value. Any suitable mapping process may be used (example of which are discussed above in connection with FIG. 2), as the invention is not limited in this respect. The process then proceeds to act 705, wherein a directory in the time-based directory structure is selected that corresponds to the time value produced from the mapping. The process then continues to act 707, wherein the content unit is stored in the selected directory When a subsequent access request, that identifies the content unit by its content address, to retrieve the content unit is received, it may be determined that the content address does not include a timestamp. Thus, to locate the directory in which the content unit is stored, the content address may be mapped to a time value using the same mapping. The directory corresponding to this time value may be determined and the content unit may be retrieved from this directory.

Virtual Pools In Time-Based Directories

Applicants have appreciated that because content sources (e.g., host computers or servers, application programs, other computers, etc.) do not directly control physical or logical storage locations for content units stored on a computer in a time-based directory structure, the content sources do not have the ability to physically or logically separate content units that are related in some way. For example, content units that are stored by the same application program may end up in entirely different physical or logical locations (e.g., because the content units were stored at different times).

Applicants have further appreciated that various administrative capabilities (e.g., different types of delete capabilities, replication capabilities, etc.) often are tied to the physical and/or logical storage location for a content unit. Thus, the inability of the content source to control physical or logical storage locations for content units may result in an inability to ensure that consistent storage system capabilities are provided for content units that are related in some way (e.g., those written by the same application program).

Furthermore, the inability of a content source to control which logical or physical storage resources are used to store content sourced thereby may result in an inability to separately track and report one or more characteristics of the content units stored on the computer from any particular content source (e.g., the storage capacity used to store the content units from the particular content source, the number of content units stored from a particular content source, etc.).

One embodiment of the invention relates to logically grouping content units into a plurality of virtual pools in a time-based directory structure. For example, each of the virtual pools may be allocated to one or more content sources so that a content source is only permitted to access content units in virtual pools that are allocated to it, and is not permitted to access content units in virtual pools that are not allocated to it.

Figure 8:
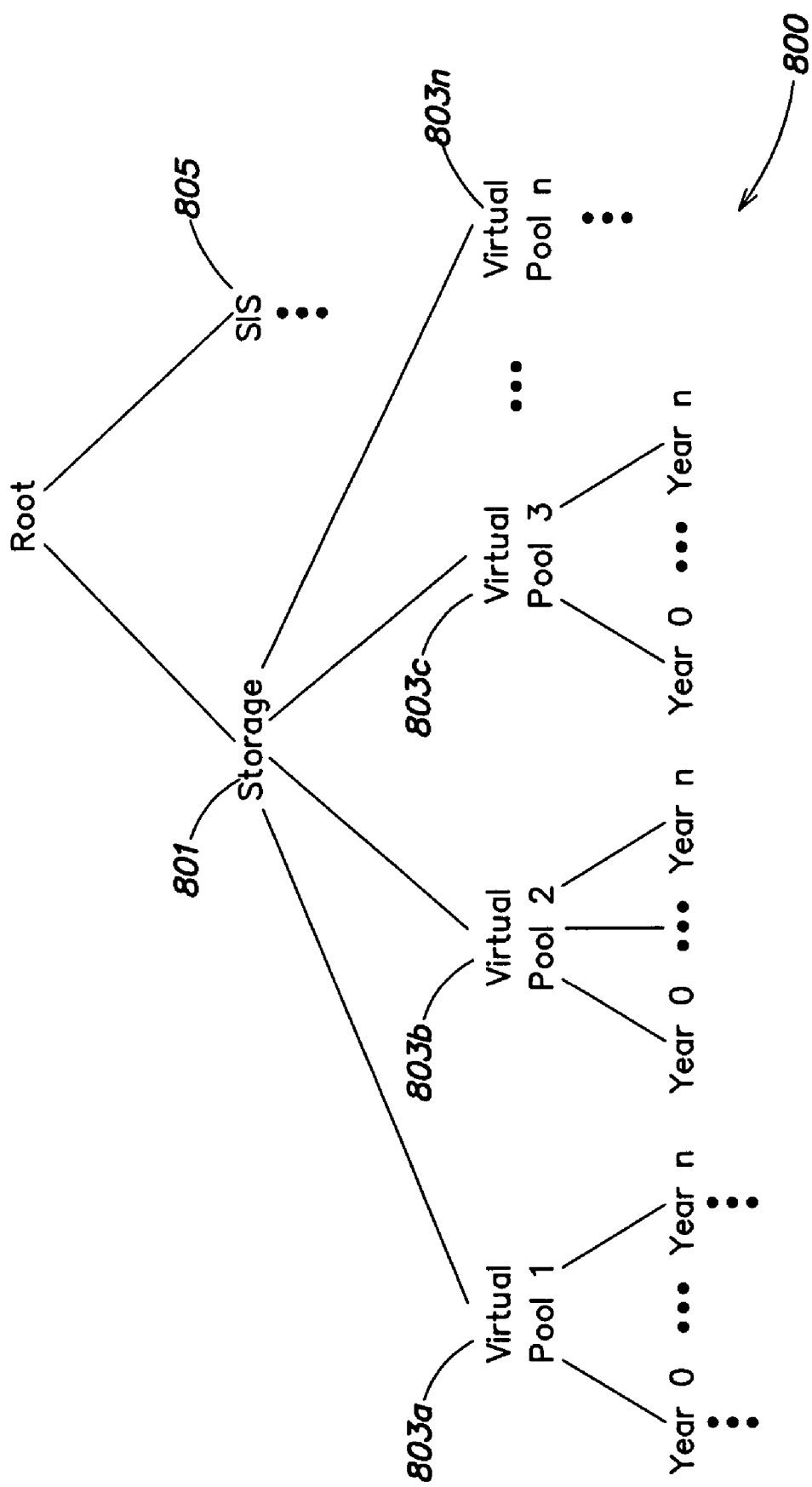
FIG. 8 is an example of a time-based directory structure that provides a virtual pools capability through the use of high level directories, in accordance with one embodiment.

Examples of the use of virtual pools are described in application Ser. Nos. 10/910,985, 10/911,330, 10/911,248, 10/911,247, and 10/911,360, each of which is listed in Table 1. Content units may be grouped into virtual pools in any suitable way. For example, as shown in FIG. 8, a storage directory structure 800 may be provided, including a root directory, and having a storage directory 801 and (optionally) an SIS directory 805. The storage directory 801 may include a plurality of "virtual pool" subdirectories (i.e., 803a, 803b, 803c, . . . , 803n), each corresponding to a virtual pool, having its own time-based directory structure. Thus, when a content unit is received for storage, it may be determined in which virtual pool the content unit belongs (e.g., based on which application program sent the request) and the content unit may be stored in the time-based directory structure below the appropriate virtual pool in the hierarchy.

Figure 9:
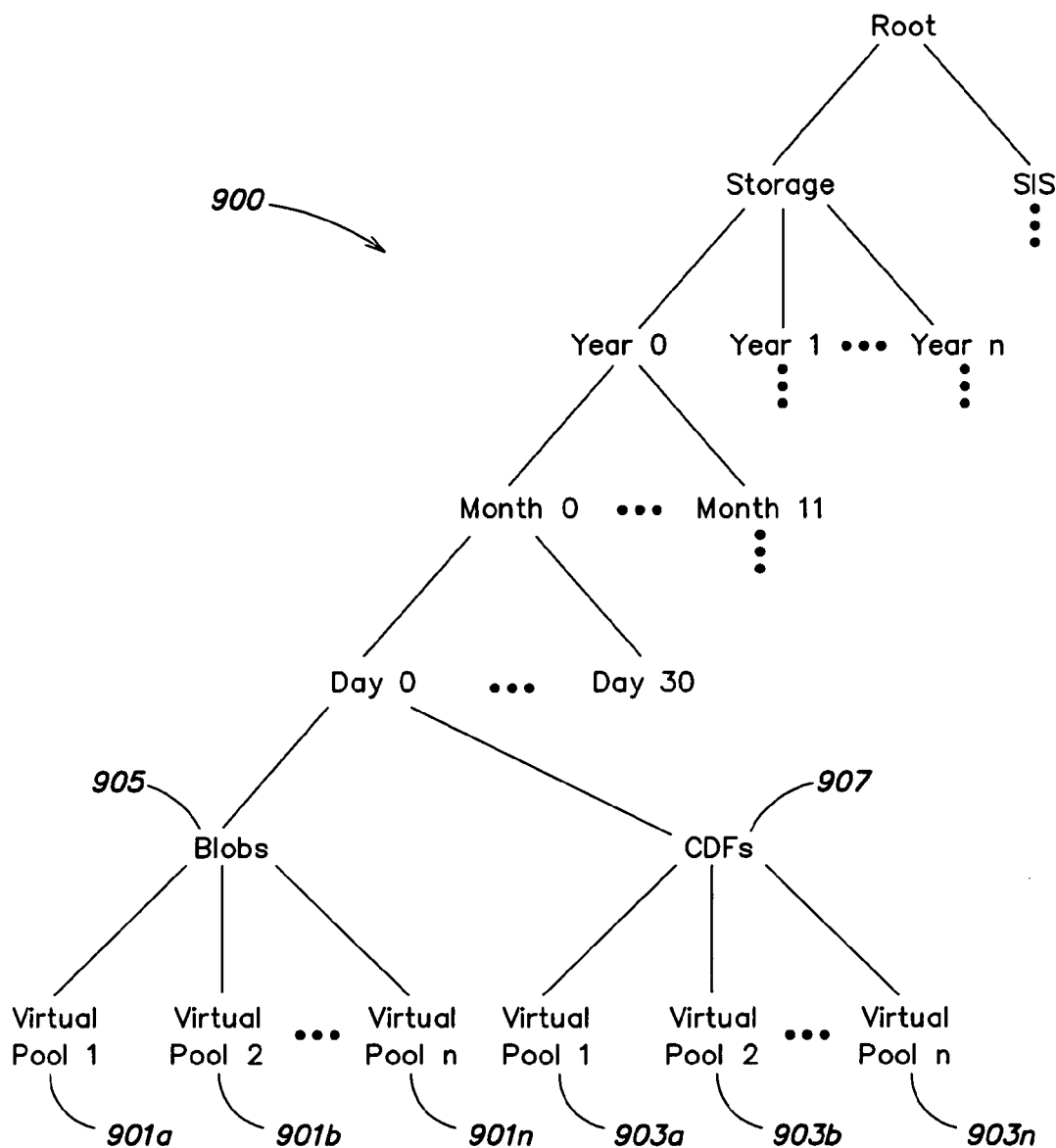
FIG. 9 is an example of a time-based directory structure that provides a virtual pools capability through the use of low-level directories, in accordance with one embodiment.

Alternatively, a directory structure 900 as shown in FIG. 9 may be used. In the directory structure of FIG. 9, each "leaf" directory includes a plurality of subdirectories, each of which corresponds to a virtual pool. Thus, the time-based directory in which a content unit is to be stored may be selected and then the content unit may be stored in the appropriate virtual pool subdirectory of that directory. For example, blobs directory 905 includes a plurality of virtual pool subdirectories (i.e., directories 901a, 901b, . . . , 901n), as does CDFs directory 907 (i.e., directories 903a, 903b, . . . , 903n). When it is determined that a content unit is to be stored, for example, in blobs directory 905 (e.g., based on the timestamp of the content address for the content unit), the appropriate virtual pools subdirectory of blobs directory 905 may be selected (e.g., based on the identity of the application program that sent the request), and the content unit may be stored in the selected virtual pools directory. Similarly, when it is determined that a content unit is to be stored in CDFs directory 907, the appropriate virtual pools subdirectory of CDFs directory 907 may be selected, and the content unit may be stored in the selected virtual pools directory.

The directory structures shown above are only examples of ways in which virtual pools may be created. Any other suitable technique may be used, as the invention is not limited in this respect. In addition, although the illustrative directory structures in FIG. 8 and FIG. 9 include an SIS directory, the aspects of the invention related to virtual pools are not limited to implementation on a systems that has a single instance store capability, as virtual pools may be implemented on a system that does not perform single instance store. Similarly, single instance store may be performed on a system that does not implement virtual pools.

Replication of Content Units

In accordance with one embodiment, content units may be replicated to a computer and stored in a time-based directory structure. That is, content units that are stored on a remote computer may be copied (e.g., over a network) and stored on a local computer in a time-based directory structure. However, because replicated content units have previously been assigned content addresses when they were initially stored on the remote computer, the timestamp in the content addresses for these replicated content units may reflect the time of storage on the remote computer and not the time at which the content unit was copied for replication. Thus, when a replicated content unit is stored in the time-based directory structure of the local computer, it may be stored in a directory corresponding to its initial time of storage on the remote computer (i.e., the time indicated in the timestamp) and not the time at which it was copied for replication.

This may present problems when performing time-based queries. A time-based query is a request to the computer to identify content units stored on the computer during a specified time range. For example, a time-based query may request identification of all content units stored on the computer between Jan. 18, 2003 and Jan. 18, 2004. However, there may be content units that were initially stored on a remote computer during the time range specified in the time-based query request, but were not replicated to the computer that received the request until after the end of the specified time range. Because such content units may be stored in the time-based directory corresponding to their timestamp, rather than a directory corresponding to their time of replication, these content units may be identified in response to a time-based query request, when, in fact, they were not stored on the computer during the specified time range.

Figure 10:
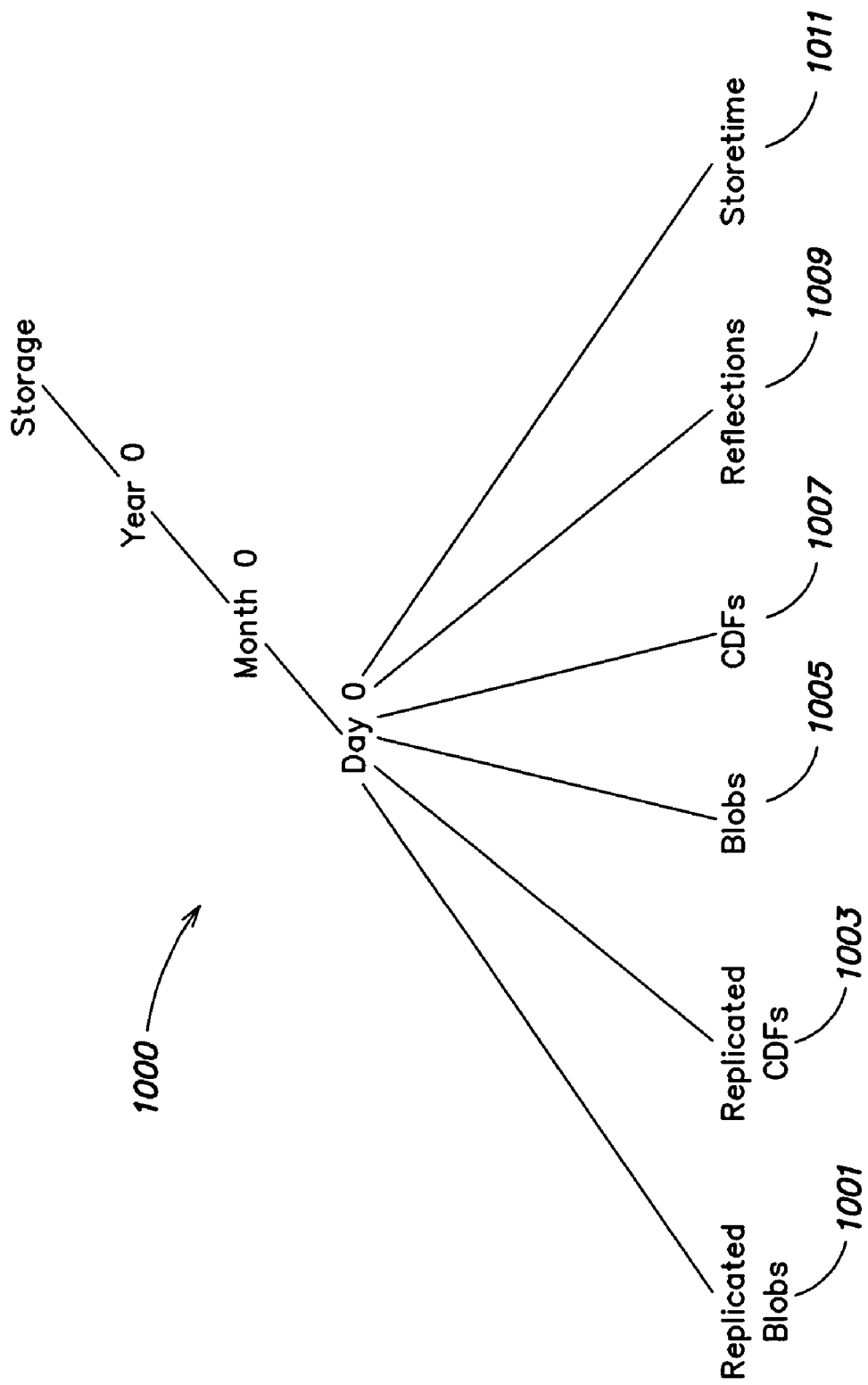
FIG. 10 is an example of a time-based directory structure in which replicated content units are stored separately from non-replicated content units, in accordance with one embodiment.

One embodiment of the invention is directed to addressing this limitation by providing a separate directory in which to store replicated content units. This is just one example of a way of addressing this limitation and the invention is not limited to this particular example, as this problem may be addressed in any suitable way. For example, a directory structure 1000, as shown in FIG. 10 may be used. In the directory structure 1000, each directory corresponding to the smallest unit of time in the directory structure ("days" in the example of FIG. 10) has a plurality of subdirectories. As discussed above, these subdirectories may include a directory in which to store blobs (i.e., directory 1005), a directory in which to store CDFs (i.e., directory 1007), and directory in which store reflections (i.e., directory 1009). In addition, there may also be a directory in which to store replicated blobs (i.e., directory 1001), a directory in which to store replicated CDFs (i.e., directory 1003), and a storetime directory (i.e., directory 1011).

It should be appreciated that in the example above, a directory structure was used that differentiated between types of content units (i.e., blobs, CDFs, and reflections). However, this is provided only as an example, as the invention is not limited to use with a system that employs different types of content units.

When a content unit is copied to the computer for replication, the directory in the directory structure corresponding to the timestamp in the content address for the content unit may be selected and the content unit may be stored in either the replicated blobs subdirectory or the replicated CDFs subdirectory of that directory (depending on whether the content unit is a blob or CDF). In addition, a storetime file may be created that identifies the content unit in any suitable way (e.g., the filename of the storetime file may include the content address of the content unit or the content of the storetime file may include that info). The directory in directory structure 1000 that corresponds to the time of arrival of the replicated content unit may then be selected and the storetime file may be stored in its storetime subdirectory.

Thus, for example, if a blob is received for replication on Feb. 19, 2005 and the timestamp in the content address of the blob indicates that the blob was initially stored on the remote computer on Mar. 3, 2003, the blob may be stored in a file in the "replicated blobs" subdirectory of the directory corresponding to Mar. 3, 2003. In addition, a storetime file that indicates the content address of the blob may be created and stored in the storetime subdirectory of the directory corresponding to Feb. 19, 2005.

When a time-based query request that indicates a particular time-range is received, the directories corresponding to units of time that fall within the time range may be located. The content units stored in the blobs subdirectories, the CDFs subdirectories, and the reflections subdirectories of the directories corresponding to unit of time within the specified time range may be identified in response to the request. However, the content units in the replicated blobs and replicated CDFs subdirectory that match the time range are not returned. Rather, the storetime files in the storetime subdirectories of the directories corresponding to unit of time within the specified time range may be accessed, and the replicated content units referenced by the storetime files may also be identified in response to the request. In this manner, in response to the time-based query, replicated content units are identified based on their time of replication and not by their time of initial storage on the remote computer, as indicated in their timestamp.

Figure 11:
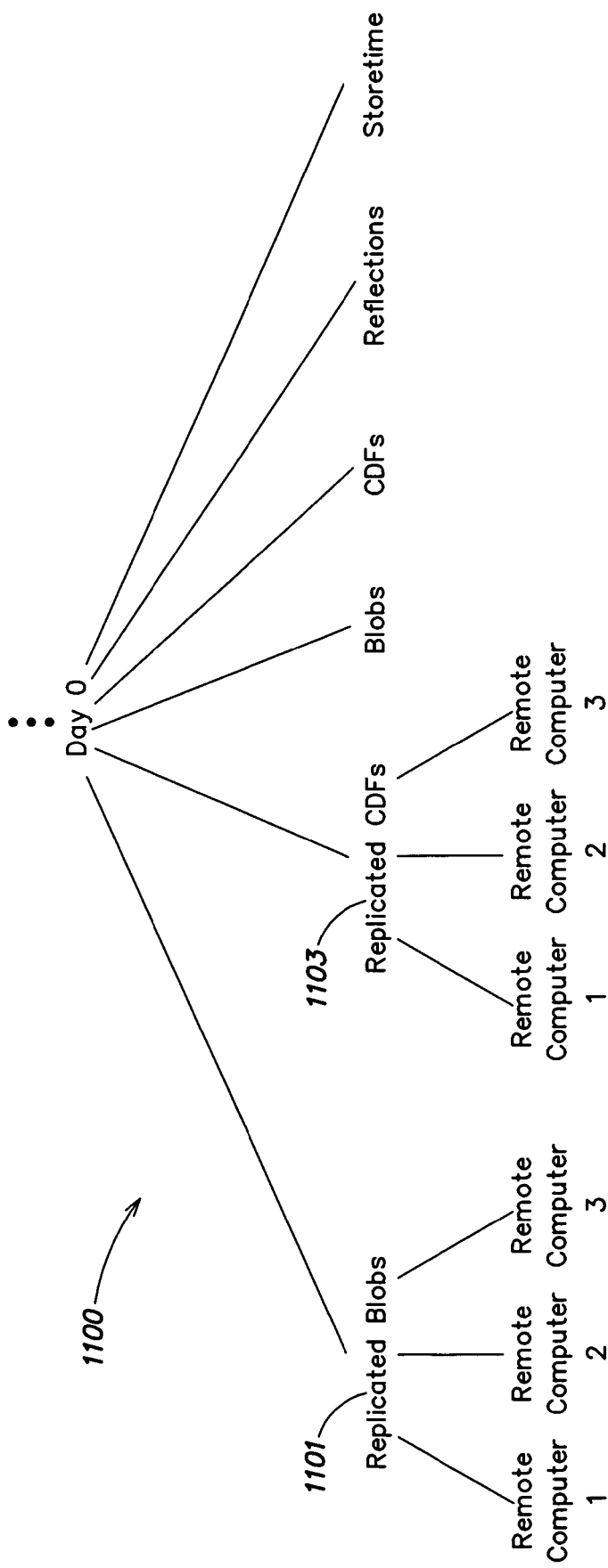
FIG. 11 is an example of a time-based directory structure in which replicated content units may be logically separated using low-level directories, based on the replication source of the content units, in accordance with one embodiment.

In one embodiment, a local computer may receive replicated content units from multiple remote computers and store these computers in a time-based directory structure as described above. If one of the remote computers desires to restore all the content units replicated to the computer (e.g., in case of loss of data on the remote computer), it may be desired to restore from the local computer only the content units that were replicated from the particular remote computer requesting the data, and not all replicated content units from all remote computers. Thus, in one embodiment of the invention a directory structure is provided that allows logical separation of replicated content units, based on the source of the content units. Directory structure 1100 in FIG. 11 is an example of such a directory structure. In directory structure 1100, the subdirectories for replicated blobs (i.e., directory 1101) and replicated CDFs (i.e., directory 1103) each have one or more subdirectories which correspond to a remote computer that replicates content units to the computer. When a replicated blob or CDF is received, it is placed in the subdirectory corresponding to the remote computer that served as the replication source. Thus, the content units replicated by a particular computer may be retrieved by accessing the subdirectories corresponding to that remote computer.

Figure 12:
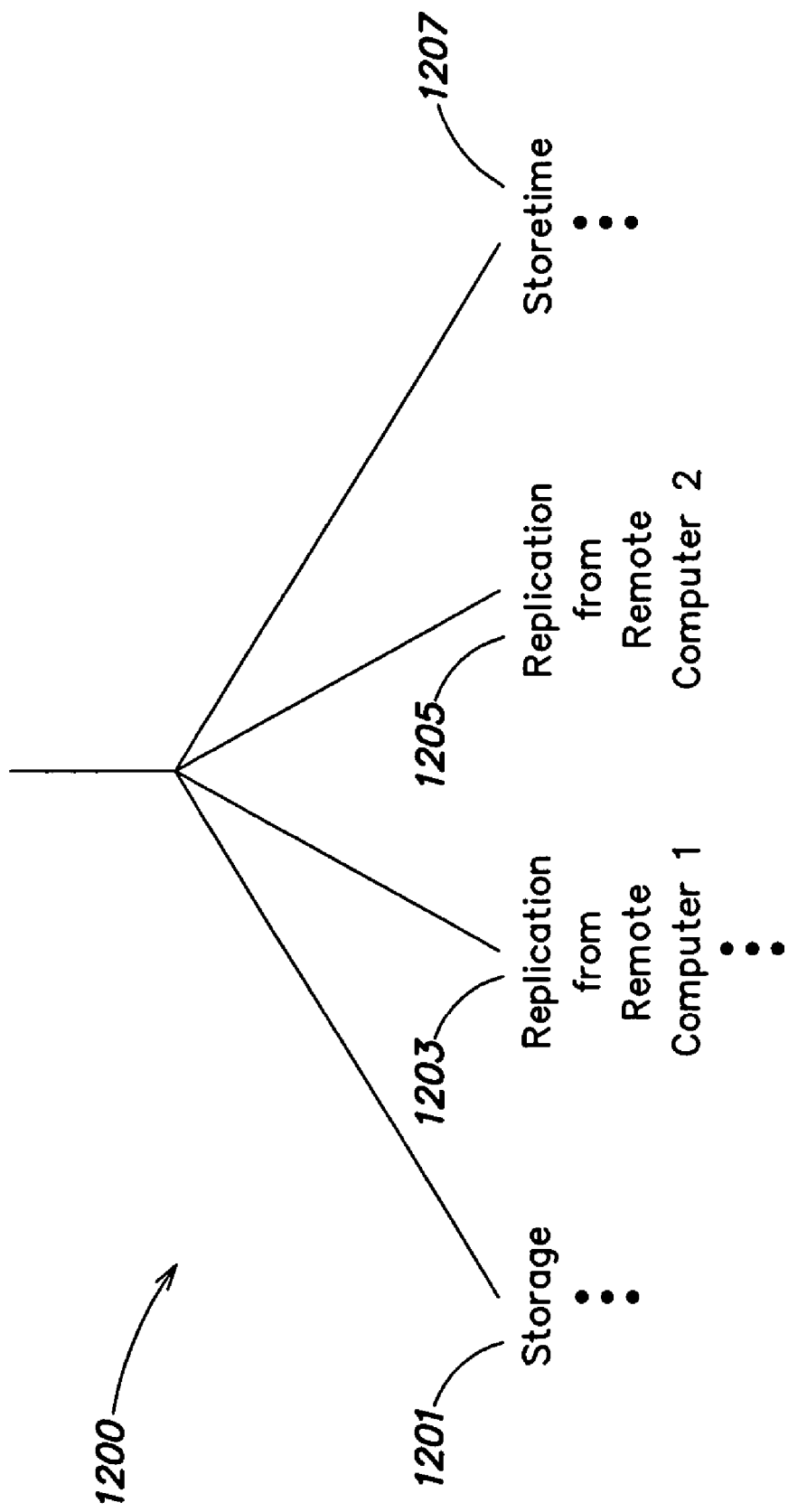
FIG. 12 is an example of a time-based directory structure in which replicated content units may be logically separated using high-level directories, based on the replication source of the content units, in accordance with one embodiment.

Alternatively, a directory structure such as directory structure 1200 in FIG. 12 may be used. In addition to having a storage directory 1201 which serves as a time-based directory for storage of (non-replicated) content units, directory structure 1200 includes a plurality of replication directories (i.e., 1203) each of which serves as the top-level directory for a separate time-based directory structure. Further, each replication directory corresponds to a remote computer which is a source of replication for content units. Thus, content units replicated to the local computer may be stored in the replication directory that corresponds to their source of replication and may be placed in the appropriate time-based subdirectory within that directory. In addition, storetime directory 1207 may be the top-level directory for another time-based directory structure and may be used so store storetime files, as discussed above, for tracking the time of replication of content units.

It should be appreciated that the directory structures in FIG. 11 and FIG. 12 are only one example of directory structures that may be used and the invention is not limited to use with any particular directory structure, as any suitable directory structure may be used.

Time-Based Bitmap

Applicants have appreciated that accessing a file system, in some situations, may be a time consuming process. Thus, when a request to read a content unit or a time-based query request is received it may be desirable to determine if there are any content units stored in the directory in which the content unit would be located if it were present on the storage system (i.e., in the case of a read request), or if there are any content units stored in the directories corresponding to units of time that fall within the time range specified in the request (i.e., in the case of a time-based query request).

In one embodiment, a bitmap may be used to make such determinations. As discussed above, a time-based directory structure may include a number of levels arranged in a hierarchy, wherein each level corresponds to a particular period of time. The lowest level in the hierarchy corresponds to the smallest unit of time and the directories at the lowest level may be referred to as lowest time granularity directories (LTGDs). In one embodiment, the bitmap includes a plurality of bits, each of which corresponds to one of the LTGDs in the time-based directory structure. If the bit is in one state (e.g., if the bit is set), this may indicate that there are no content units stored in the LTGD directory corresponding to the bit. If the bit is in the other state (e.g., if the bit is not set), this may indicate that there are content units stored in the LTGD directory. The bitmap may be checked prior to accessing the directory structure, so that if it is determined that no content units are stored in one or more of the relevant LTGD directories, these directories need not be accessed.

It should be appreciated that the concept of time-based bitmap is not limited to the illustrative implementation described above, as any suitable implementation may be used.

The above-described embodiments of the present invention can be implemented on any suitable computer or system. Examples of suitable computers and/or systems are described in the patent applications listed below in Table 1 (collectively "the CAS applications"), each of which is incorporated herein by reference. It should be appreciated that the computers and systems described in these applications are only examples of computers and systems on which the embodiments of the present invention may be implemented, as the invention is not limited to implementation on any of these content addressable storage systems, or to content addressable storage systems at all.

In one embodiment, the invention may be implemented on a storage system. Any suitable type of storage system may be used, such as for example, a block I/O storage system and/or a CAS storage system. Further, the invention may also be implemented on a distributed storage system, which is described in the applications in Table 1. The invention may also be implemented on a host computer that performs content addressable storage capabilities. Such a computer is described in Ser. Nos. 11/021,892, 11/022,022, 11/022,077, 11/021,756, 11/021,012, and 11/021,378 listed in Table 1 below. As described in greater detail in these applications, the computer may be coupled to a storage system (e.g., a block I/O storage system), such that it provides a content addressable interface to the storage system. In summary, it should be understood that the invention may be implemented on any suitable computer system and the invention is not limited in this respect.

TABLE 1

| Title | Ser. No. | Filing Date |
|---|---|---|
| Content Addressable Information, Encapsulation, Representation, And Transfer | 09/236,366 | Jan. 21, 1999 |
| Access To Content Addressable Data Over A Network | 09/235,146 | Jan. 21, 1999 |
| System And Method For Secure Storage Transfer And Retrieval Of Content Addressable Information | 09/391,360 | Sep. 7, 1999 |
| Method And Apparatus For Data Retention In A Storage System | 10/731,790 | Dec. 9, 2003 |
| Methods And Apparatus | 10/731,613 | Dec. 9, 2003 |

TABLE 1-continued

| Title | Ser. No. | Filing Date |
|---|---|---|
| For Facilitating Access To Content In A Data Storage System | | |
| Methods And Apparatus For Caching A Location Index In A Data Storage System | 10/731,796 | Dec. 9, 2003 |
| Methods And Apparatus For Parsing A Content Address To Facilitate Selection Of A Physical Storage Location In A Data Storage System | 10/731,603 | Dec. 9, 2003 |
| Methods And Apparatus For Generating A Content Address To Indicate Data Units Written To A Storage System Proximate In Time | 10/731,845 | Dec. 9, 2003 |
| Methods And Apparatus For Modifying A Retention Period For Data In A Storage System | 10/762,044 | Jan. 21, 2004 |
| Methods And Apparatus For Extending A Retention Period For Data In A Storage System | 10/761,826 | Jan. 21, 2004 |
| Methods And Apparatus For Indirectly Identifying A Retention Period For Data In A Storage System | 10/762,036 | Jan. 21, 2004 |
| Methods And Apparatus For Indirectly Identifying A Retention Period For Data In A Storage System | 10/762,043 | Jan. 21, 2004 |
| Methods And Apparatus For Increasing Data Storage Capacity | 10/787,337 | Feb. 26, 2004 |
| Methods And Apparatus For Storing Data In A Storage Environment | 10/787,670 | Feb. 26, 2004 |
| Methods And Apparatus For Segregating A Content Addressable Computer System | 10/910,985 | Aug. 4, 2004 |
| Methods And Apparatus For Accessing Content In A Virtual Pool On A Content Addressable Storage System | 10/911,330 | Aug. 4, 2004 |
| Methods and Apparatus For Including Storage System Capability Information In An Access Request To A Content Addressable Storage System | 10/911,248 | Aug. 4, 2004 |
| Methods And Apparatus For Tracking Content Storage In A Content Addressable Storage System | 10/911,247 | Aug. 4, 2004 |
| Methods and Apparatus For Storing Information Identifying A Source Of A Content Unit Stored On A Content Addressable System | 10/911,360 | Aug. 4, 2004 |
| Software System For Providing Storage System Functionality | 11/021,892 | Dec. 23, 2004 |
| Software System For Providing Content Addressable Storage System Functionality | 11/022,022 | Dec. 23, 2004 |
| Methods And Apparatus For Providing Data Retention Capability Via A Network Attached Storage Device | 11/022,077 | Dec. 23, 2004 |
| Methods And Apparatus For Managing Storage In A Computer System | 11/021,756 | Dec. 23, 2004 |
| Methods And Apparatus For Processing Access Requests In A Computer System | 11/021,012 | Dec. 23, 2004 |
| Methods And Apparatus For Accessing Information In A Hierarchical File System | 11/021,378 | Dec. 23, 2004 |
| Methods And Apparatus | 11/034,613 | Jan. 12, 2005 |

TABLE 1-continued

| Title | Ser. No. | Filing Date |
|---|---|---|
| For Storing A Reflection On A Storage System | | |
| Method And Apparatus For Modifying A Retention Period | 11/034,737 | Jan. 12, 2005 |
| Methods And Apparatus For Managing Deletion of Data | 11/034,732 | Jan. 12, 2005 |

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer-implemented method of accessing a replicated content unit on a computer, the replicated content unit being replicated at a first time that is different from an initial time of storage of the replicated content unit and being stored in a hierarchical file system on the computer, the hierarchical file system having a plurality of directories arranged in a hierarchical tree, comprising at least one root directory and a plurality of non-root directories that each has a parent directory, wherein at least one of the plurality of directories in the tree correspond to a period of time subsumed by a period of time corresponding to the respective parent directory of the at least one of the plurality of directories, wherein the plurality of directories comprises a first plurality of directories used to locate content units based on a time of replication on the computer and a second plurality of directories used to locate content units based on an initial time of storage, wherein the replicated content unit is stored in one of the plurality of second directories, wherein a storetime file corresponding to the replicated content unit is stored in one of the plurality of first directories that corresponds to the first time, and wherein the replicated content unit is assigned an identifier that identifies the replicated content unit on the computer and that is generated, at least in part, from at least a portion of the content of the replicated content unit, the method comprising acts of:

(A) receiving, at the computer, a request to identify content units replicated to the computer during a specified time range that includes the first time;

(B) determining that the replicated content unit was replicated during the specified time range by determining the one of the plurality of first directories that corresponds to the first time and locating the storetime file in the one of the first plurality of directories; and (C) returning an indication that the replicated content unit was replicated to the computer during the specified time range.

2. The computer-implemented method of claim 1, wherein the storetime file includes information usable to locate the replicated content unit in the one of the plurality of second directories.

3. The computer-implemented method of claim 1, wherein the replicated content unit is associated with an identifier that is computed based, at least in part, on the content of the replicated content unit.

4. The computer-implemented method of claim 1, wherein the identifier includes a timestamp that indicates a time related to the initial time of storage of the replicated content unit.

5. The computer-implemented method of claim 4, wherein the one of the plurality of second directories corresponds to the time indicated by the timestamp.

6. At least one computer readable storage medium encoded with instructions that, when executed on a computer system, perform a method of accessing a replicated content unit on a computer, the replicated content unit being replicated at a first time that is different from an initial time of storage of the replicated content unit and being stored in a hierarchical file system on the computer, the hierarchical file system having a plurality of directories arranged in a hierarchical tree, comprising at least one root directory and a plurality of non-root directories that each has a parent directory, wherein at least one of the plurality of directories in the tree correspond to a period of time subsumed by a period of time corresponding to the respective parent directory of the at least one of the plurality of directories, wherein the plurality of directories comprises a first plurality of directories used to locate content units based on a time of replication on the computer and a second plurality of directories used to locate content units based on an initial time of storage, wherein the replicated content unit is stored in one of the plurality of second directories, wherein a storetime file corresponding to the replicated content unit is stored in one of the plurality of first directories that corresponds to the first time, and wherein the replicated content unit is assigned an identifier that identifies the replicated content unit on the computer and that is generated, at least in part, from at least a portion of the content of the replicated content unit, the method comprising acts of:
- (A) receiving, at the computer, a request to identify content units replicated to the computer during a specified time range that includes the first time;
- (B) determining that the replicated content unit was replicated during the specified time range by determining the one of the plurality of first directories that corresponds to the first time and locating the storetime file in the one of the first plurality of directories; and
- (C) returning an indication that the replicated content unit was replicated to the computer during the specified time range.

7. The at least one computer readable storage medium of claim 6, wherein the storetime file includes information usable to locate the replicated content unit in the one of the plurality of second directories.

8. The at least one computer readable storage medium of claim 6, wherein the replicated content unit is associated with an identifier that is computed based, at least in part, on the content of the replicated content unit.

9. The at least one computer readable storage medium of claim 6, wherein the identifier includes a timestamp that indicates a time related to the initial time of storage of the replicated content unit.

10. The at least one computer readable storage medium of claim 9, wherein the one of the plurality of second directories corresponds to the time indicated by the timestamp.

11. At least one computer that has a replicated content unit stored thereon, the replicated content unit being replicated at a first time that is different from an initial time of storage of the replicated content unit and being stored in a hierarchical file system on the computer, the hierarchical file system having a plurality of directories arranged in a hierarchical tree, comprising at least one root directory and a plurality of non-root directories that each has a parent directory, wherein at least one of the plurality of directories in the tree correspond to a period of time subsumed by a period of time corresponding to the respective parent directory of the at least one of the plurality of directories, wherein the plurality of directories comprises a first plurality of directories used to locate content units based on a time of replication on the computer and a second plurality of directories used to locate content units based on an initial time of storage, wherein the replicated content unit is stored in one of the plurality of second directories, wherein a storetime file corresponding to the replicated content unit is stored in one of the plurality of first directories that corresponds to the first time, and wherein the replicated content unit is assigned an identifier that identifies the replicated content unit on the at least one computer and that is generated, at least in part, from at least a portion of the content of the replicated content unit, the at least one computer comprising:
- at least one input; and
- at least one controller, coupled to the at least one input, that:
  - (A) receives, through the at least one input, a request to identify content units replicated to the computer during a specified time range that includes the first time;
  - (B) determines that the replicated content unit was replicated during the specified time range by determining the one of the plurality of first directories that corresponds to the first time and locating the storetime file in the one of the first plurality of directories; and
  - (C) returns an indication that the replicated content unit was replicated to the computer during the specified time range.

12. The at least one computer of claim 11, wherein the storetime file includes information usable to locate the replicated content unit in the one of the plurality of second directories.

13. The at least one computer of claim 11, wherein the replicated content unit is associated with an identifier that is computed based, at least in part, on the content of the replicated content unit.

14. The at least one computer of claim 11, wherein the identifier includes a timestamp that indicates a time related to the initial time of storage of the replicated content unit.

15. The at least one computer of claim 14, wherein the one of the plurality of second directories corresponds to the time indicated by the timestamp.

16. A computer-implemented method of replicating a content unit on a computer, the computer having a hierarchical file system that has a plurality of directories arranged in a hierarchical tree, comprising at least one root directory and a plurality of non-root directories that each has a parent directory, wherein at least some of the plurality of directories in the tree correspond to a period of time subsumed by a period of time corresponding to the respective parent directories of the at least some of the plurality of directories, wherein the plurality of directories comprises a first plurality of directories used to locate content units based on a time of replication on the computer and a second plurality of directories used to locate content units based on an initial time of storage, the method comprising acts of:
- (A) receiving, at the computer, a request to replicate a content unit to the computer, wherein the request is received at a first time;
- (B) storing the replicated content unit in the hierarchical file system of the computer, in one of the second plurality of directories that does not correspond to a time related to the first time, wherein the replicated content unit is assigned an identifier that identifies the replicated content unit on the computer and that is generated, at least in part, from at least a portion of the content of the replicated content unit; and
- (C) storing, in one of the first plurality of directories that corresponds to the first time, a storetime file that is related to the replicated content unit.

17. The computer-implemented method of claim 16, wherein the replicated content unit is associated with an identifier that is computed based, at least in part, on the content of the replicated content unit.

18. The computer-implemented method of claim 17, wherein the identifier includes a timestamp that indicates a time related to an initial time of storage of the replicated content unit.

19. The computer-implemented method of claim 18, wherein the one of the second plurality of directories that stores the replicated content unit corresponds to a time related to the time indicated in the timestamp.

20. The computer-implemented method of claim 16, wherein the act (C) firther comprises an act of:
- (C1) storing a storetime file in one of the first plurality of directories that corresponds to the first time, wherein the storetime file includes information usable to locate the replicated content unit in the second plurality of directories.

21. At least one computer readable storage medium encoded with instructions that, when executed on a computer system, perform a method of replicating a content unit on a computer in the computer system, the computer having a hierarchical file system that has a plurality of directories arranged in a hierarchical tree, comprising at least one root directory and a plurality of non-root directories that each has a parent directory, wherein at least some of the plurality of directories in the tree correspond to a period of time subsumed by a period of time corresponding to the respective parent directories of the at least some of the plurality of directories, wherein the plurality of directories comprises a first plurality of directories used to locate content units based on a time of replication on the computer and a second plurality of directories used to locate content units based on an initial time of storage, the method comprising acts of:

(A) receiving, at the computer, a request to replicate a content unit to the computer, wherein the request is received at a first time;

(B) storing the replicated content unit in the hierarchical file system of the computer, in one of the second plurality of directories that does not correspond to a time related to the first time, wherein the replicated content unit is assigned an identifier that identifies the replicated content unit on the computer and that is generated, at least in part, from at least a portion of the content of the replicated content unit; and (C) storing, in one of the first plurality of directories that corresponds to the first time, a storetime file that is related to the replicated content unit.

22. The at least one computer readable storage medium of claim 21, wherein the replicated content unit is associated with an identifier that is computed based, at least in part, on the content of the replicated content unit.

23. The at least one computer readable storage medium of claim 22, wherein the identifier includes a timestamp that indicates a time related to an initial time of storage of the replicated content unit.

24. The at least one computer readable storage medium of claim 23, wherein the one of the second plurality of directories that stores the replicated content unit corresponds to a time related to the time indicated in the timestamp.

25. The at least one computer readable storage medium of claim 21, wherein the act (C) further comprises an act of:

(C1) storing a storetime file in one of the first plurality of directories that corresponds to the first time, wherein the storetime file includes information usable to locate the replicated content unit in the second plurality of directories.

26. At least one computer that stores replicated content units, the at least one computer having a hierarchical file system that has a plurality of directories arranged in a hierarchical tree, comprising at least one root directory and a plurality of non-root directories that each has a parent directory, wherein at least some of the plurality of directories in the tree correspond to a period of time subsumed by a period of time corresponding to the respective parent directories of the at least some of the plurality of directories, wherein the plurality of directories comprises a first plurality of directories used to locate content units based on a time of replication on the computer and a second plurality of directories used to locate content units based on an initial time of storage, and wherein the at least one controller stores the replicated content unit in one of the second plurality of directories, the at least one computer comprising:

at least one input; and at least one controller, coupled to the at least one input, that:

(A) receives, through the at least one input, a request to replicate a content unit to the computer, wherein the request is received at a first time;

(B) stores the replicated content unit in the hierarchical file system of the at least one computer, in one of the second plurality of directories that does not correspond to a time related to the first time, wherein the replicated content unit is assigned an identifier that identifies the replicated content unit on the computer and that is generated, at least in part, from at least a portion of the content of the replicated content unit; and (C) stores, in one of the first plurality of directories that corresponds to the first time, a storetime file that is related to the replicated content unit.

27. The at least one computer of claim 26, wherein the replicated content unit is associated with an identifier that is computed based, at least in part, on the content of the replicated content unit.

28. The at least one computer of claim 27, wherein the identifier includes a timestamp that indicates a time related to an initial time of storage of the replicated content unit.

29. The at least one computer of claim 28, wherein the one of the second plurality of directories that stores the replicated content unit corresponds to a time related to the time indicated in the timestamp.

30. The at least one computer of claim 26, wherein the at least one controller stores a storetime file in one of the first plurality of directories that corresponds to the first time, wherein the storetime file includes information usable to locate the replicated content unit in the second plurality of directories.

* * * * *